No. 710,125. Patented Sept. 30, 1902.
C. B. TRESCOTT.
METHOD OF CURING FOOD PRODUCTS.
(Application filed June 5, 1900.)
(No Model.) 3 Sheets—Sheet 1.
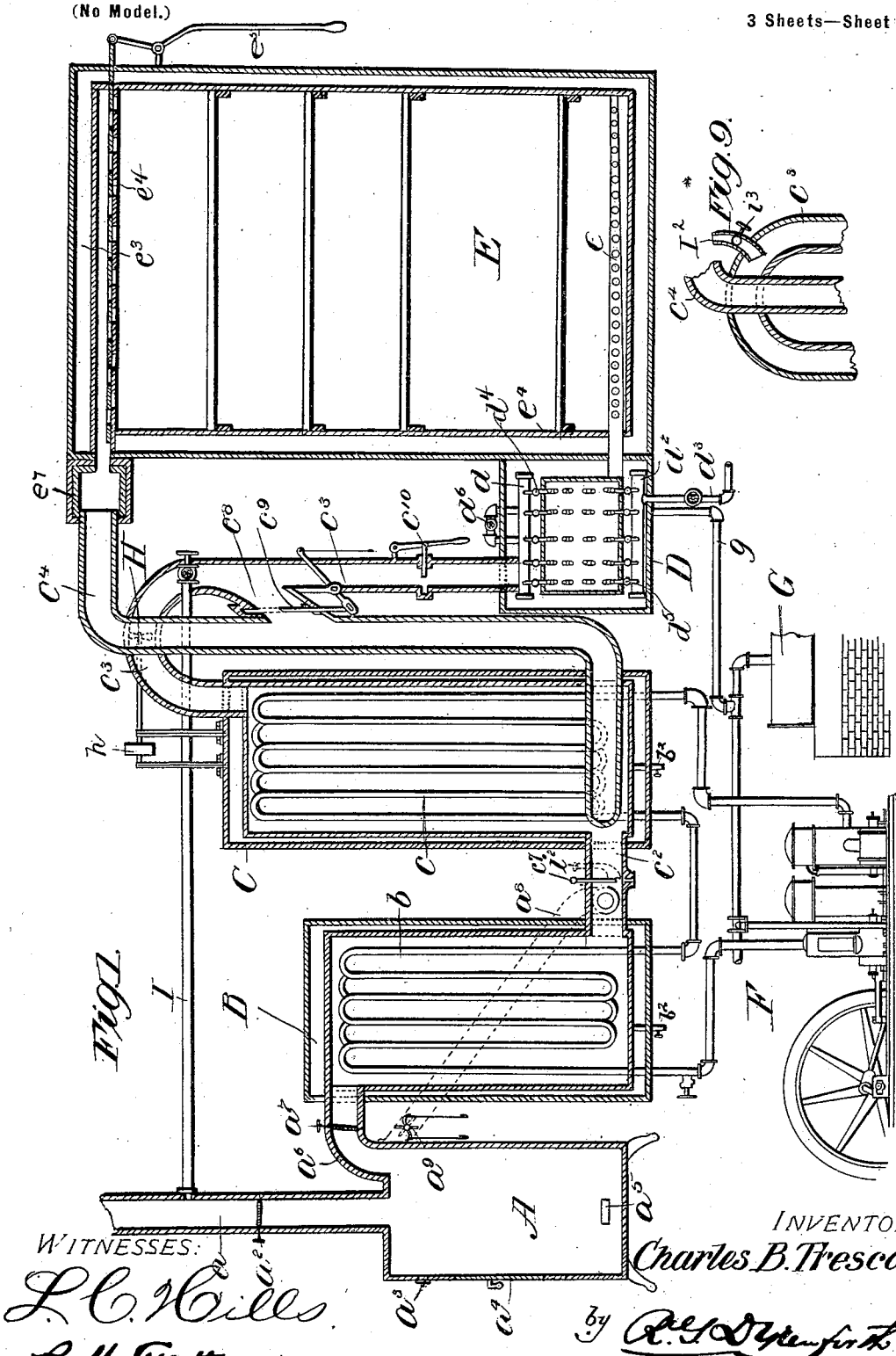
INVENTOR:
Charles B. Trescott,
by his attorney.
WITNESSES:

No. 710,125. Patented Sept. 30, 1902.
C. B. TRESCOTT.
METHOD OF CURING FOOD PRODUCTS.
(Application filed June 5, 1900.)
(No Model.) 3 Sheets—Sheet 2.
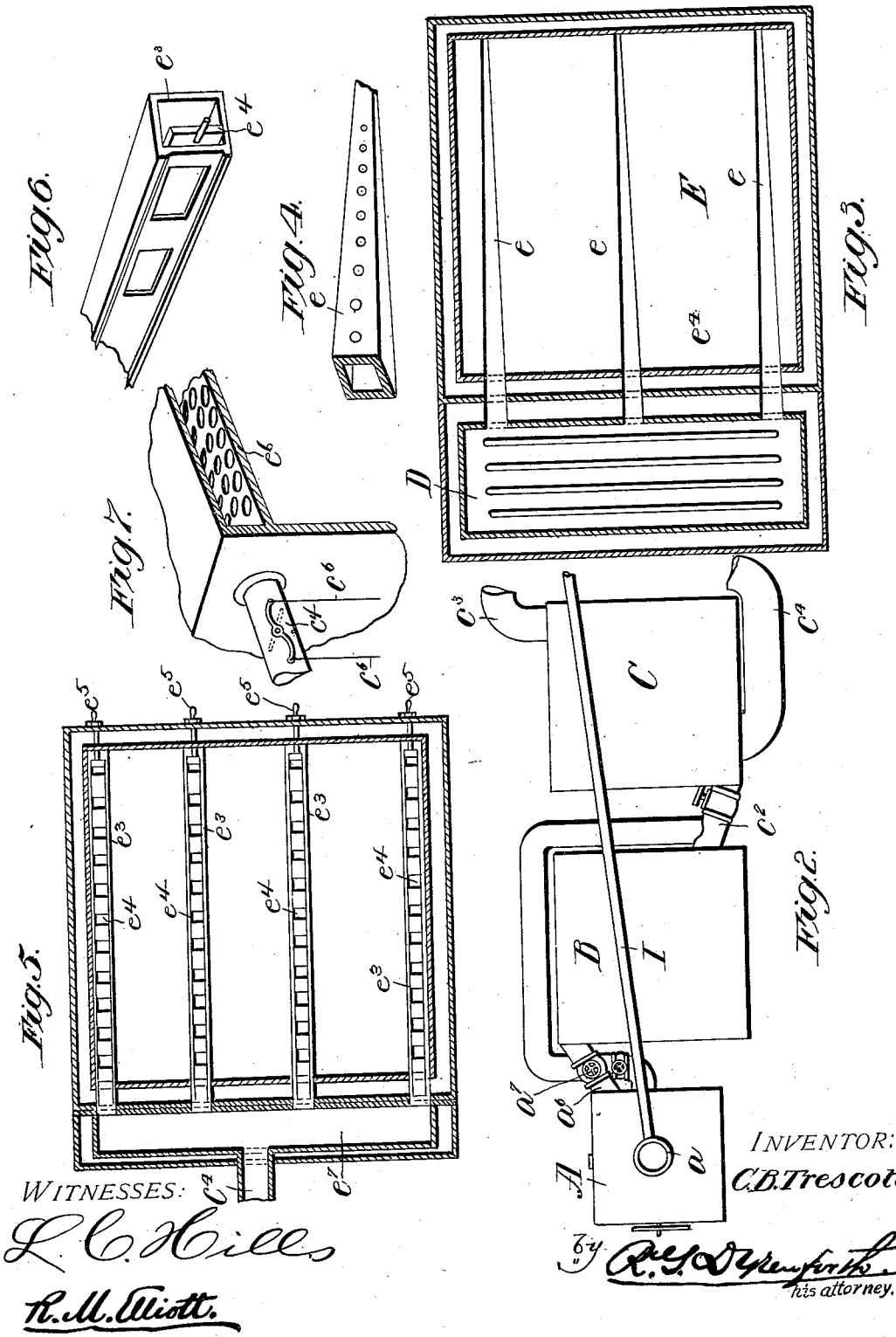
WITNESSES:
L. C. Hills
R. M. Elliott.
INVENTOR:
C. B. Trescott,
by R. S. Dyrenforth
his attorney.

No. 710,125. Patented Sept. 30, 1902.
C. B. TRESCOTT.
METHOD OF CURING FOOD PRODUCTS.
(Application filed June 5, 1900.)
(No Model.) 3 Sheets—Sheet 3.
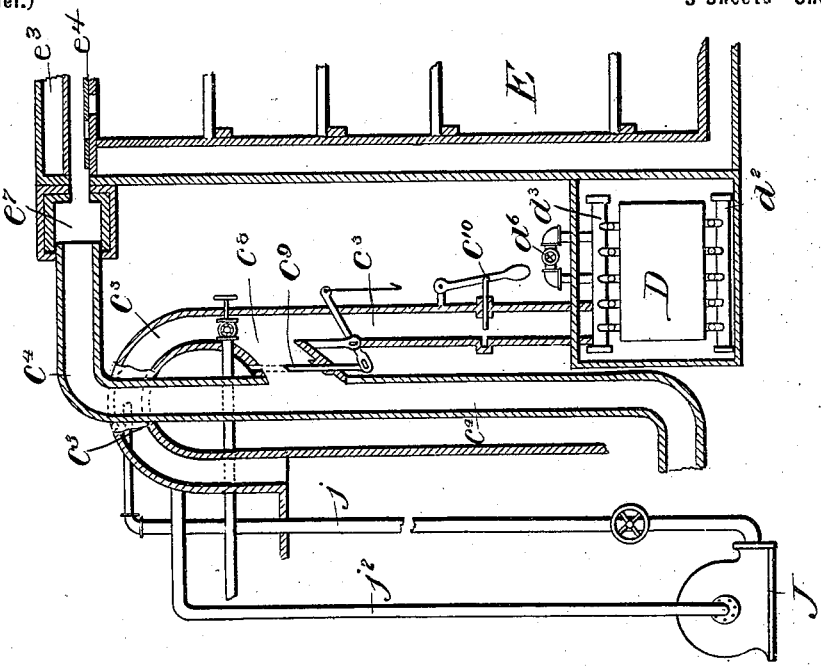
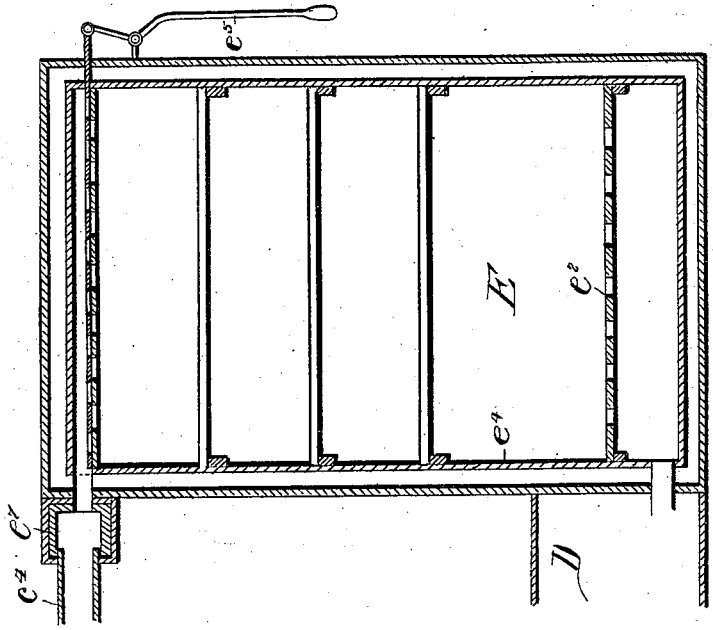
WITNESSES:
L. C. Hills.
R. M. Elliott.
INVENTOR:
Charles B. Trescott,
by his attorney.

UNITED STATES PATENT OFFICE.

CHARLES B. TRESCOTT, OF PORTLAND, OREGON.

METHOD OF CURING FOOD PRODUCTS.

SPECIFICATION forming part of Letters Patent No. 710,125, dated September 30, 1902.

Application filed June 5, 1900. Serial No. 19,169. (No specimens.)

*To all whom it may concern:*

Be it known that I, CHARLES B. TRESCOTT, a citizen of the United States, residing at Portland, in the county of Multnomah and State of Oregon, have invented certain new and useful Improvements in Methods of Curing Food Products; and I do hereby declare the following to be a full, clear, and exact description of the invention, such as will enable others skilled in the art to which it appertains to make and use the same.

Objectionable features in the smoke-curing of food matter as ordinarily practiced are, first, the uniformly high temperature in the smoking or curing chamber, which in many instances causes shrinkage, loss of essence and flavor, and general deterioration in hot weather and in cold or damp weather scorching, leaving the interior moist and resulting in a semicooking of the food product instead of in a curing, in the curing of oily fish, such as salmon, this high degree of heat causing the oil to start, leaving the fish dry; second, the presence in the preservative products of combustion of free carbon and other matter tending to discolor the food matter; third, insufficient exposure of the matter under treatment, and, fourth, waste of preservative.

The expedient practiced by some of cooling the smoke before applying it to the food matter is not fitted to all cases, as I have found that to get the best results difference of treatment is requisite consonant with the kind of food matter under subjection and the state of the weather. I have ascertained by experiment the varying temperatures best suited to the kind of matter and have devised a method of curing by means of which the temperature and length of treatment may be varied to suit the matter to be cured and the other conditions present, and whereby free carbon and undue moisture may be eliminated from the preservative and waste of the preservative be avoided.

My invention therefore consists in the method of smoke-curing of food matter whereby the preservative is presented to such matter in an ideal condition as to temperature, dryness, and pureness, and, if desired, after such presentation may be again brought to such ideal condition and again presented, thus effecting the proper treatment of the food matter and great economy in operation.

In the accompanying drawings I have illustrated a preferred form of apparatus for carrying into effect my process, though it will be understood that my method is not dependent upon any specific apparatus, but that its efficiency resides in the proper carrying out of the steps thereof, and in these drawings—

Figure 1 is a view in sectional elevation displaying a plant designed to carry my invention into effect. Fig. 2 is a view in plan of a portion of the same. Fig. 3 is a view in sectional plan displaying the means by which the preservative is supplied to the smoking-chamber at the bottom thereof. Fig. 4 is a detail perspective view of one of the flues or conduits for conveying the preservative from the smoke-generator to the smoking-chamber. Fig. 5 is an inverted view in plan, showing the mechanism by which the escape of the preservative from the top of the smoking-chamber is controlled. Fig. 6 is a fragmentary detail view in perspective exhibiting the means shown generally in Fig. 5. Fig. 7 is a view showing a modified form of means by which the escape of the preservative from the smoking-chamber is controlled. Fig. 8 is a view in sectional elevation, displaying a form of arrangement for causing distribution of the preservative from the smoke-generator into the smoking-chamber. Fig. 9 is a detached detail view in section, exhibiting a form of vent which may be employed in lieu of that shown in Fig. 1. Fig. 10 is a view in sectional elevation displaying a form of draft-inducing mechanism which may be employed in lieu of that shown in Fig. 1.

Referring to the drawings, A designates a smoke-generator having chimneys $a$, provided with valve $a^2$ and also having a damper $a^3$, stoking-door $a^4$, and draft $a^5$.

B and C are cooling, drying, and scrubbing chambers, the peculiar functions of which are hereinafter more fully described, which may be in series, as shown, or consolidated in one chamber. These chambers are connected with the smoke-generator at the top by flue $a^6$, containing valve $a^7$, and with each other at the bottom by flue $c^2$, containing valve $c^7$. They are provided with valved discharges $b^2$ for flushing purposes and contain valved pipe-coils $b$ and $c$, connecting with an ordinary refrigerating plant F.

D represents a heating-chamber connected with the chamber C at the top by flue $c^3$, containing valve $c^{10}$. The chamber D contains independent valved coils of pipe $d^4$ and $d^5$ between a steam-feed header $d$, connected by valved pipe with steam-boiler G, and a steam-discharge header $d^2$, having valved discharge-pipe $b^3$.

E designates a smoking or curing chamber having double walls and suitable means for suspending food material therein and provided with a door and having on its bottom perforated tapered pipes $e$, Fig. 1, or having a top perforated chamber below, Fig. 8, to cause uniform discharge of the preservative entering the curing-chamber from the heating-chamber. The top of the curing-chamber has exit-ducts controlled by the perforated slide $e^4$, adapted to be controlled by external lever $e^5$, Figs. 1 and 5, or it may be provided with a perforated top, Fig. 7, the ducts leading to a cross-flue $e^7$.

From the top of the curing-chamber E flue $c^4$, which may contain a valve $c^6$, communicates with the bottom of the chamber C and by shunt-passage $c^8$, containing valve $c^9$, with the passage $c^3$, leading from the chamber C to the chamber D. Within the flue $c^3$ is located a blast-fan H, run by the pulley $h$, which fan exerts a suction on the generator and the cooling, drying, and scrubbing chambers and a pressure upon the heating and curing chambers. Located on the pressure side of this fan may be placed a vent communicating by pipe I with the chimney of the generator. This vent may be provided as in Fig. 9, or in lieu of a vent at this point it may be placed in the flue connecting the chambers B and C, as represented at $i^2$, or any other suitable portion of the apparatus, it only being necessary that the requisite amount of preservative be allowed to escape to maintain the combustion in the generator. This same purpose may be served by a leaky construction of some portion of the apparatus, such as a loose door to the curing-chamber.

The boiler G supplies steam to run the refrigerating plant, to heat the chamber B, and for such other purposes as may be desired in connection with the operation of the plant, such as flushing the chambers B and C.

The flue $a^8$, containing the valve $a^9$, forms a direct connection between the top of the generator A and the flue $c^2$, thus effecting, if desired, a cutting out of operation of one of the cooling, drying, and scrubbing chambers.

In operation under ordinary conditions the several chambers are used in complete series. The refrigerating plant supplies the coils in chambers B and C with refrigerating medium. The boiler G supplies steam to the coils in chamber D. A fire is kindled in the smoke-generator A, and when sufficiently ignited the valve in the chamber is closed, and the smoke passes successively into chambers B and C, where its moisture is condensed into frost upon the cold coils, and the unconsumed carbon and other impurities are by the frost there caught and deposited. When it is desired to remove collected impurities, connections may be made by which steam may be turned into the refrigerating-coils, and the melting frost on their surface will carry with it the impurities to the sloping floor, thence through the valved discharge-pipes to the outside. I have throughout the description and claims employed the term "scrubbing" to denote the removal from the preservative of contained impurities—such, for example, as unconsumed carbon. From the chambers B and C the smoke, now practically colorless and its moisture eliminated, passes to the heating-chamber D, where it is brought to the desired temperature by opening or closing one or more of the independent coils by their respective valves. Thence through the perforated pipes $e$ it passes into the curing-chamber E, where it is diffused over and about suspended food matter, thence through the perforated top and through flue $c^4$ to the bottom of chamber C, there to be recooled, redried, and repurified and by mingling with the fresh preservative entering from the generator be revivified, and thus in cycle. If the weather or the matter under treatment or any other conditions be such as not to require such extended subjection of the preservative to the cooling, drying, and scrubbing area, by closing the valve $a^7$ and opening the valve $a^9$ the chamber B may be cut out of operation and the preservative passed directly from A to C. If the conditions be such that a single passage through the chambers B and C does not sufficiently cool, dry, and scrub the preservative, it may be caused to retraverse the chamber C prior to entering the heating and curing chambers by opening the valve $c^9$ in the shunt-passage $c^8$ and partially closing the valve $c^{10}$ in the passage $c^3$.

The location of the fan, vents, valves, &c., may obviously be altered, some of them may be omitted, other means may be employed to induce circulation, and the exhaust may be accomplished in various ways, all without departing from the spirit of my invention, wherefore I do not desire to be limited to the specific construction shown.

From the above description it will be seen that my improved method consists, independent of any particular form of apparatus, in generating the preservative and by means of refrigeration cooling, drying, and scrubbing the same, then by reheating, or, if desirable, by again passing the same through the refrigerating-chamber, bringing the dried and purified preservative to the degree of temperature best adapted to the food matter to be treated, then passing the same into the curing-chamber and causing it to be maintained under pressure concentrated and diffused in and about the food matter under treatment, then withdrawing so much of the spent preservative as may be necessary to preserve combustion in the generator and subjecting the remainder again to the process of cooling, drying, and scrubbing and regulation of its temperature, and thus in cycle.

Having thus fully described my invention, what I claim as new, and desire to secure by Letters Patent of the United States, is—

1. In the curing of food matter, the method of preparing the preservative for subjection thereto, which consists in simultaneously drying and scrubbing it by and under refrigeration, and then bringing it to the temperature adapted to the particular article to be cured, substantially as described.

2. The method of curing food matter, which consists in simultaneously drying and scrubbing the preservative fluid, reheating the same, and subjecting the matter to be cured to the action of said fluid, substantially as described.

3. The method of curing food matter, which consists in simultaneously drying and scrubbing the preservative fluid, reheating the same, and subjecting the matter to be cured to the action of said fluid in an inclosed space, substantially as described.

4. The method of curing food matter, which consists in simultaneously drying and scrubbing the preservative products of combustion, heating the same to a desired temperature, and subjecting the matter to be cured to the action of such preservative, substantially as described.

5. The method of curing food matter, which consists in simultaneously drying and scrubbing the preservative products of combustion, reheating the same, and then subjecting the matter to be cured to the action of such preservative in an inclosed space, substantially as described.

6. The method of curing food matter, which consists in simultaneously drying and scrubbing the preservative products of combustion, reheating the same to the degree best adapted to the kind of food matter under treatment, and subjecting said matter to the action of said preservative in an inclosed space, substantially as described.

7. The method of curing food matter, which consists in simultaneously drying and scrubbing the preservative fluid by bringing the same into contact with a refrigerating-surface, reheating the same, and subjecting the matter to be cured to the action of said fluid, substantially as described.

8. The method of curing food matter, which consists in simultaneously drying and scrubbing the preservative products of combustion by bringing the same into contact with a refrigerating-surface, heating the same to a desired temperature, and subjecting the matter to be cured to the action of such preservative, substantially as described.

9. In the curing of food matter, the hereinbefore-described method of preparing the preservative fluid for presentation to food matter, which consists in simultaneously drying and scrubbing, and then reheating the same, substantially as described.

10. In the curing of food matter, the hereinbefore-described method of preparing the preservative products of combustion for presentation to food matter, which consists in simultaneously drying the same and removing unconsumed carbon therefrom, and then reheating, substantially as described.

11. In the curing of food matter, the hereinbefore-described method of preparing the preservative products of combustion for presentation to food matter, which consists in simultaneously removing moisture and unconsumed carbon therefrom, and reheating said preservative, substantially as described.

12. The method of curing food matter, which consists in simultaneously drying and scrubbing the preservative products of combustion, uniformly maintaining the same at the degree of temperature best adapted to the particular kind of food matter to be cured and causing a continuous circulation of the preservative about the matter to be treated, and permitting escape of a small portion of such preservative, to be replaced by fresh preservative, substantially as described.

13. The method of curing food matter, which consists in taking the preservative products of combustion and simultaneously drying and removing therefrom unconsumed carbon, then subjecting the preservative thus treated to a heating medium, then causing the preservative thus heated to circulate around and against the food matter placed in an inclosed space, then again causing such preservative to be subjected to simultaneous drying and scrubbing, and reheating and permitting a portion of the preservative to escape, to be replaced by fresh preservative, substantially as described.

In testimony whereof I affix my signature in the presence of two subscribing witnesses.

CHARLES B. TRESCOTT.

Witnesses:
CHARLES H. CAREY,
L. S. ROGERS.